United States Patent [19]

Honda et al.

[11] Patent Number: 5,234,274
[45] Date of Patent: Aug. 10, 1993

[54] SELF-ALIGNING ROLLER BEARING WITH RETAINER

[75] Inventors: Akiyoshi Honda, Zushi; Eiichi Kawamura, Fujisawa, both of Japan

[73] Assignee: NSK Ltd., Tokyo, Japan

[21] Appl. No.: 983,746

[22] Filed: Dec. 1, 1992

[30] Foreign Application Priority Data

Dec. 5, 1991 [JP] Japan .................. 3-348459

[51] Int. Cl.$^5$ .................. F16C 33/52; F16C 23/08
[52] U.S. Cl. .................. 384/574; 384/558
[58] Field of Search .............. 384/574, 558, 572, 575, 384/576, 568

[56] References Cited

U.S. PATENT DOCUMENTS

| | | | |
|---|---|---|---|
| 1,871,149 | 8/1932 | Brown | 384/574 |
| 2,586,406 | 2/1952 | Wallgren | 384/568 |
| 3,144,284 | 8/1964 | Ortegren | 384/574 |
| 4,684,268 | 8/1987 | Sahlgren et al. | 384/574 |

FOREIGN PATENT DOCUMENTS

62-141313  6/1987  Japan .
2-180314  7/1990  Japan .

*Primary Examiner*—Thomas R. Hannon
*Attorney, Agent, or Firm*—Foley & Lardner

[57] ABSTRACT

A self-aligning roller bearing with retainer has a plurality of the rollers having an end face in which a ring-shaped concave section is formed, and a pair of retainers having a frustum shape, and arranged with the larger diameter section axially inside, the retainer having a pocket to hold each roller and, an outward flange extending from the larger diameter section, and the outward flange having a tongue coming into slidable contact with the ring-shaped concave section of the rollers.

4 Claims, 6 Drawing Sheets

SELF-ALIGNING ROLLER BEARING WITH RETAINER

BACKGROUND OF THE INVENTION

1. Field of the Invention

This invention relates to a self-aligning roller bearing with retainer which can be installed in all kinds of mechanical devices, for example, to support a rotating shaft inside a housing.

2. Description of the Prior Art

Figure 9:
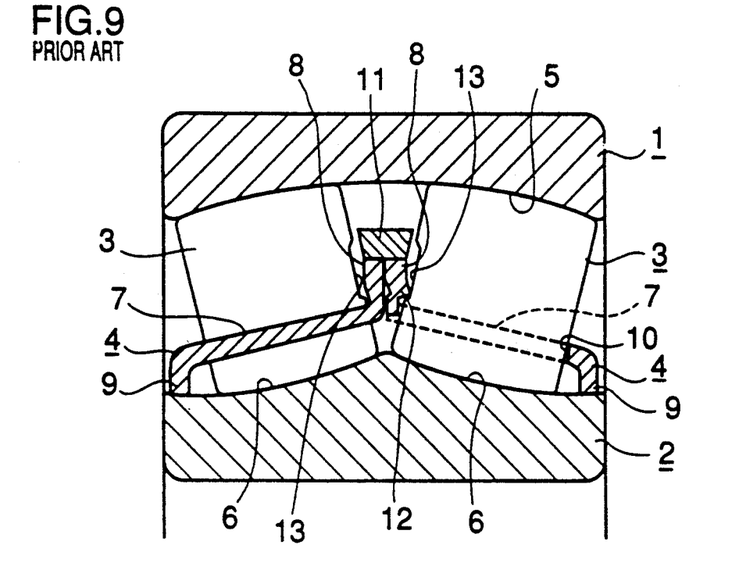
FIG. 9 is a cross-sectional view of an example of the prior art roller bearing.
Figure 10:
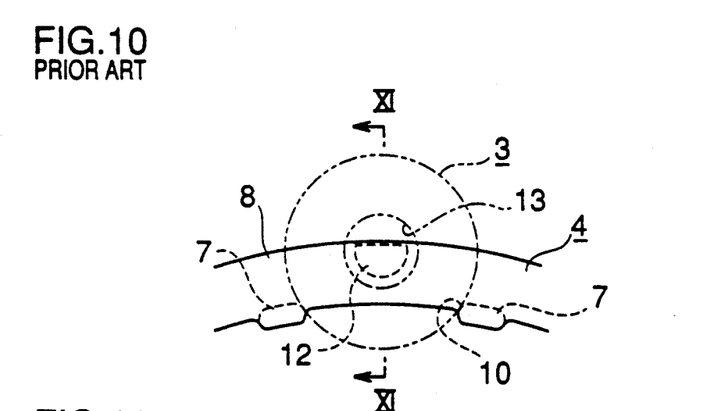
FIG. 10 is the left side view of the right retainer of FIG. 9 as seen from the left of FIG. 9.
Figure 11:
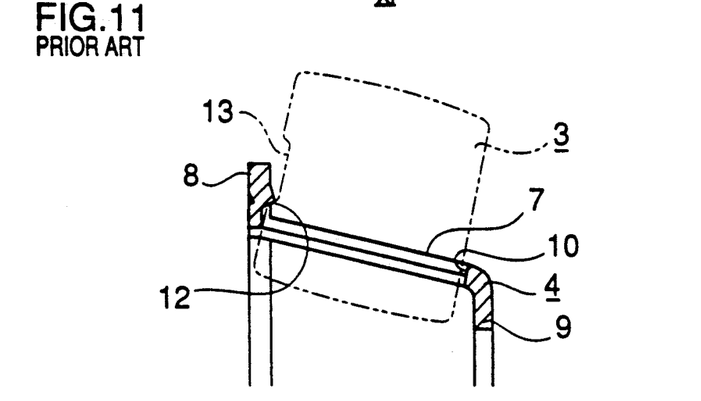
FIG. 11 is a sectional view XI—XI of the retainer of FIG. 10.

Conventionally, in order to freely rotatably support a shaft loaded inside a housing, a self-aligning roller bearing with retainer as shown in FIGS. 9 thru 11 was used. In FIG. 10 and 11, the rollers 3 are illustrated by phantom lines.

This kind of self-aligning roller bearing with retainer comprises an outer ring 1, an inner ring 2 arranged concentric with the outer ring 1, a plurality of rollers 3 with cylindrically spherical surface located between the outer ring 1 and the inner ring 2 and arranged so that they turn freely, and retainers 4 (press retainers) which are made by press-forming a metal plate and used for preventing the rollers 3 from becoming separated.

An outer race 5, having a spherical concave surface with a single center, is formed on the inner peripheral surface of the outer ring 1. Also, a pair of inner races 6 are formed on the outer peripheral surface of the inner ring 2 and juxtaposed in the width direction (left and right direction of FIG. 9) to face the outer race 5. The rollers 3 are formed generally symmetrically in the direction of roller axis with the section having the largest diameter located in the axial center of the roller length, and arranged in two rows between the outer race 5 and the pair of inner races 6 so that they turn freely.

The retainer 4 has a main part 7 having a frustum shape, an outward flange 8 extending outward in the radial direction from the peripheral edge of the larger diameter section of the main part 7, and an inward flange 9 extending inward in the radial direction from the peripheral edge of the smaller diameter section on the main part 7.

Figure 13:
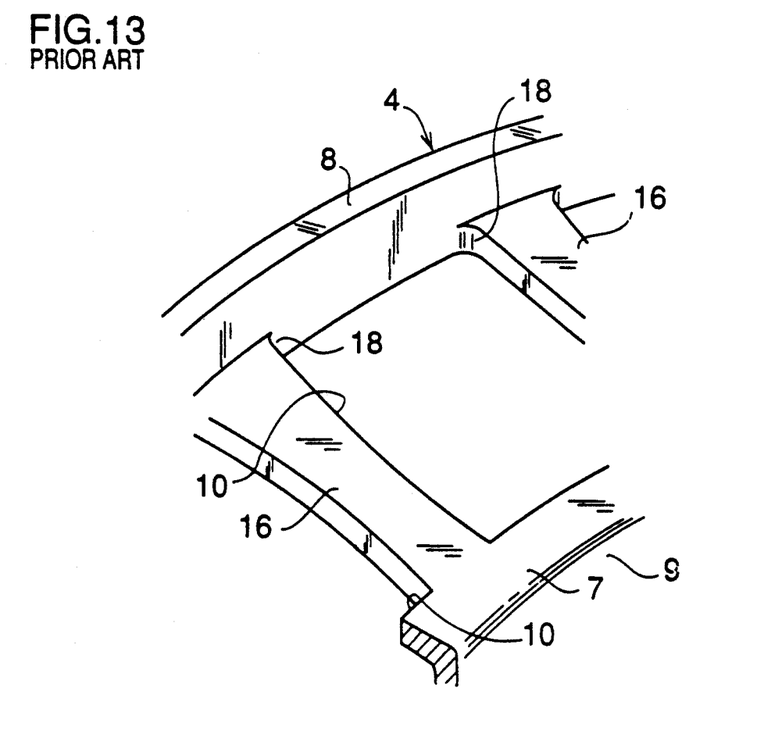
FIG. 13 is a perspective view of the retainer of FIG. 11 partically cut away, as seen from the outside.

The main part 7 has a plurality of ribs 16 to connect the outward and inward flanges as shown in FIG. 13, such that there are a plurality of pockets 10 formed in the main part 7, wherein each of the pockets 10 supports one of the rollers 3 so that it turns freely. In FIG. 9, the edge of the pocket 10 of the main part 7 behind the right roller 3 is illustrated by dotted lines. In FIG. 10, the ribs 16 behind the outward flange 8 is also illustrated by dotted lines.

By locating this main part 7 on the radially inside of the pitch circle of the rollers 3 (the circle that connects the pair of center axes of the rollers 3), the pockets 10 prevent each of the rollers 3 from falling out in the radially inward direction of main part 7.

In addition, the roller bearing has a guide ring 11 which is freely rotatably located between the two rows of rollers 3.

The outward flanges 8 of the pair of retainers 4 are guided by the guide ring 11 with the outer peripheral edge of the outward flange 8 fitted into the inside peripheral surface of the guide ring 11. Also, the inward flanges 9 are guided by the inner ring 2 with the inner peripheral edge of the inward flanges 9 fitted onto the outer peripheral surface of an axial edge section of the inner ring 2.

There is an engagement relationship between the rollers 3 and the retainers 4 to prevent the rollers 3 from falling out of the pockets 10. For example, as disclosed in Japanese Patent First Publications No. (Showa) 62-141313 and No. (Heisei) 2-180314, a projection 12 is formed toward the rollers by inclining in an offset manner a portion of the outward flange 8 at the circumferentially middle portion of each of the pockets 10 near the outer perpheral edge of each of the outward flanges 8. Also, a concave section 13 is formed on the end face of the rollers 3 in the location which faces the projection 12. By bringing the tip of the projection 12 in engagement with the concave section 13, the rollers 3 held inside each of the pockets 10 are prevented from falling out in the radially outward direction. As a result, the rollers 3 are supported so that they rotate freely inside the pockets 10 and cannot fall out of the pockets 10 in either the inward or outward radial direction.

In the self-aligning roller bearing with retainer described above, when a rotating shaft is supported inside the housing, the outer ring 1 is inserted into and fixed to the the housing with the inner ring 2 fixed from outside to the rotating shaft. When the inner ring 2 rotates together with the rotating shaft, the rollers 3 turn allowing the rotating shaft to rotate. If the axis of the housing does not coincide with the axis of the rotating shaft, the inner ring 2 is aligned inside the outer ring 1 to compensate for the non-coincidence, and, because the outer race 5 is formed with a single spherical surface, rotation of the rollers 3 is smooth even after compensation of the non-coincidence.

However, the following problems must be solved for this prior art self-aligning roller bearing with retainer.

The rollers 3 held inside the pockets 10 are prevented from falling out in the radially outward direction because the concave section 13 on the end face of the rollers 3 comes into engagement with the projection 12 on the outer edge of the outward flange 8. However, in order to prevent the rollers 3 from falling out with assurance, it is necessary that the projection 12 and the concave section 13 securely come together. Consequently, the depth of the concave section 13 must be large for better engagement with the projection 12, or the stiffness of the outward flange 8 with the projections 12 formed in it must be increased (strengthened).

Figure 12:
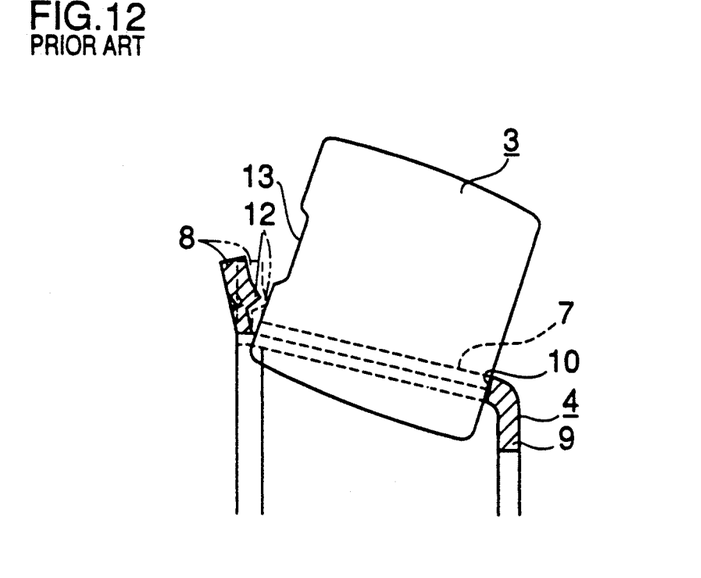
FIG. 12 is a cross-sectional view showing the installation of a roller into the retainer of FIG. 11.

On the other hand, when the rollers 3 are installed inside the pockets 10, it is necessary to elastically deform the outward flange 8 with the projection 12 outward, so that the roller 3 are snapped into the pocket 10 as shown in FIG. 12. In order to perform this installation easily, it is necessary to make the concave section 13 shallow for easy engagement and disengagement between the projection 12 and the concave section 13 and to make stiffness of the outward flange 8 small (weak) for easy snapping.

Therefore, conventionally, the plate thickness of the metal plate used to make the retainer 4 was made thin so that the rollers 3 could be securely installed or snapped into the pockets 10, resulting in that the strength of the retainer 4 was lowered so long as the retainer 4 was made thin.

SUMMARY OF THE INVENTION

The objective of this invention is to provide a self-aligning roller bearing with retainer which takes the above problems into consideration.

Another objective of the present invention is to provide a self-aligning roller bearing with retainer having a sufficient strength of the retainer and improved installation of the rollers into the retainer, so that the life of the bearing is made longer at an inexpensive cost.

DESCRIPTION OF THE PREFERRED EMBODIMENT

The self-aligning roller bearing with retainer of this invention is, as in the conventional self-aligning roller bearing with retainer described above, comprised of an outer ring having an outer race which has a spherical concave surface with a single center formed in the inside peripheral surface of the outer ring, an inner ring having a pair of inner races formed on the outer peripheral surface of the inner ring and facing the outer race, a plurality of freely rotatable rollers with cylindrically spherical surface arranged in two rows between the outer race and inner races, and a pair of retainers with a frustum-shaped main part located further inward in the radial direction than the pitch circle of the rollers, and having a plurality of pockets which support the rollers so that they rotate freely.

These retainers are formed with an outward flange on the edge of the larger diameter section and an inward flange on the edge of the smaller diameter section. The outward flange extends outward in the radial direction, and the inward flange extends inward in the radial direction.

A freely rotating guide ring is located axially between the two rows of rollers with the outer peripheral edge of the outward flange being guided by the inside peripheral surface of the guide ring, and with the inner peripheral edge of the inward flange being guided by the outer peripheral surface of the axial end section of the inner ring.

In the self-aligning roller bearing with retainer of this invention, the rollers have a concave section on one end face thereof which faces the outward flange. The concave section has desirably an annular shape. Also, a tongue is formed on the inner peripheral edge of the outward flange at the circumferentially middle section of the pockets, so that the tongue is slightly projected toward the end face of the rollers when installed. By engagement of the tip of this tongue with the concave section of the roller, the rollers are prevented from falling out of the pockets. It should be noted that the rollers have a concave section on each end face of the rollers in practice.

The operation of the self-aligning roller bearing with retainer of this invention, when a rotating shaft is supported inside the housing, is substantially the same as the prior art self-aligning roller bearing with retainer described above.

It should be noted that the self-aligning roller bearing with retainer of this invention prevents the rollers held in the pockets from falling out in the radial directions by the engagement of the tongue with the concave section.

Now turning to FIGS. 1 thru 8 which show an embodiment of the press retainer of this invention, the parts of this invention are substantially the same as that of the prior art self-aligning roller bearing with retainer, and given the like reference numerals, and duplication in the explanation will be omitted for them. Below, the characteristic parts of this invention will be explained.

Figure 1:
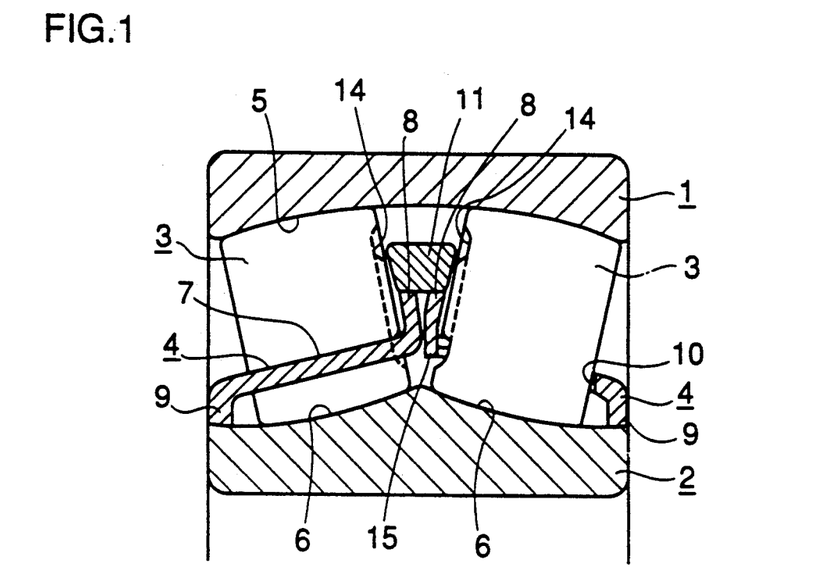
FIG. 1 is a cross-sectional view showing the roller bearing of an embodiment of the present invention.
Figure 2:
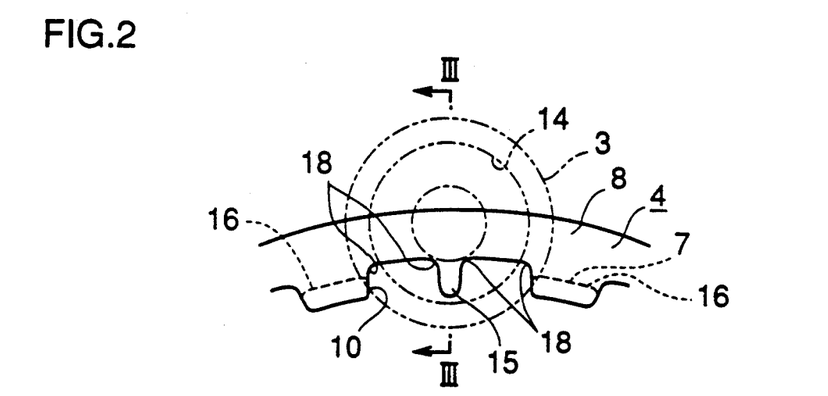
FIG. 2 is a left side view of the right retainer of FIG. 1 as seen from the left to show an example of the tongue.

A ring-shaped or annular concave section 14 is formed in an end face of a plurality of symmetrical rollers 3 which faces the outward flange 8 formed on the axially inside or larger peripheral edge of the retainer 4. Tongues 15 are formed on the inner peripheral edge of the outward flange 8 respectively, and each tongue 15 is located in the circumferentially middle section of each pocket 10. The tongues 15 extend substantially inward in the radial direction from the inside peripheral edge of the outward flange 8 so that they slightly project toward the end face of the rollers 3.

Figure 3:
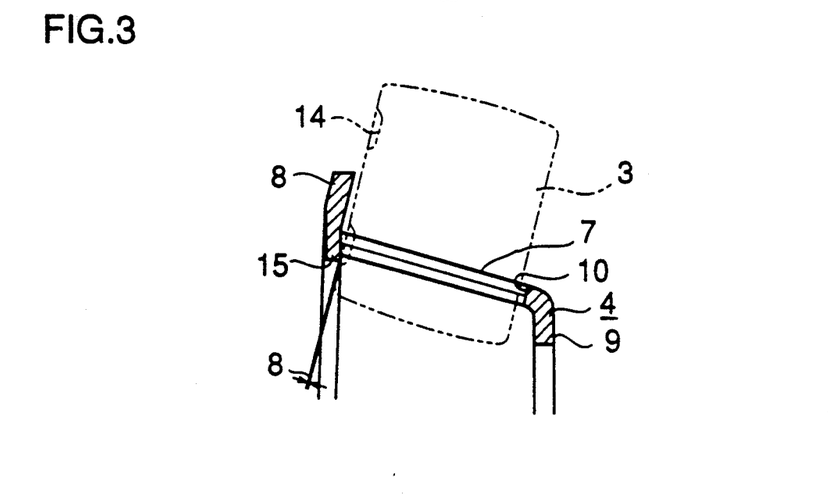
FIG. 3 is a sectional view III—III of the retainer shown in FIG. 2.

When installing each roller 3 into a pocket 10, the tip of the tongue 15 is snapped into the concave section 14 formed in the end face of the roller 3 so as to come in slidable engagement with the concave section 14 by a span "x", as shown in FIG. 3, preventing the roller 3 from falling out of the pocket 10.

Figure 4:
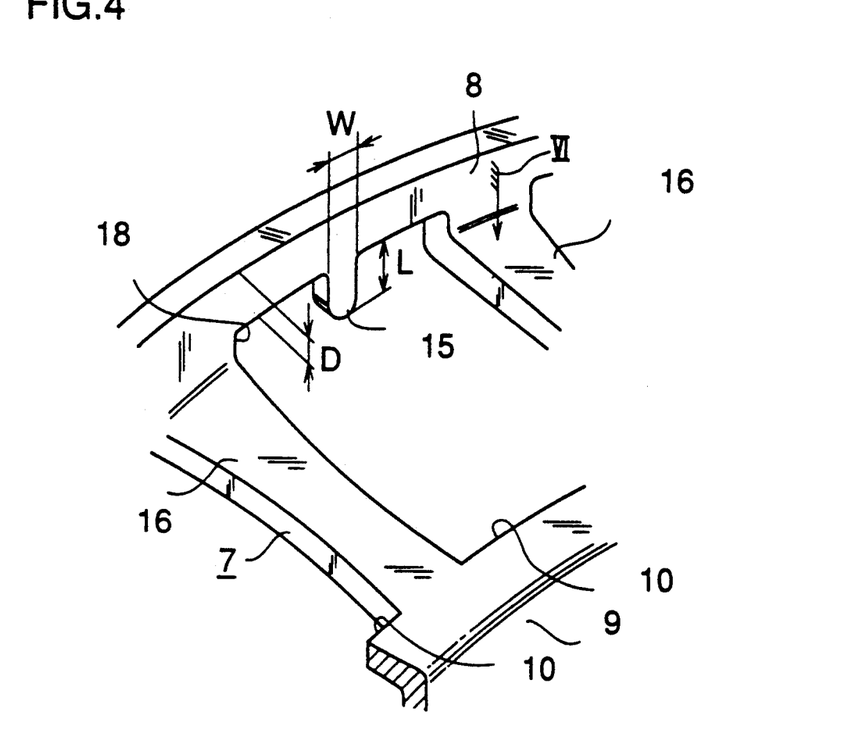
FIG. 4 is a perspective view of the retainer of FIG. 2, partially cut-away, as seen from the outside.
Figure 5:
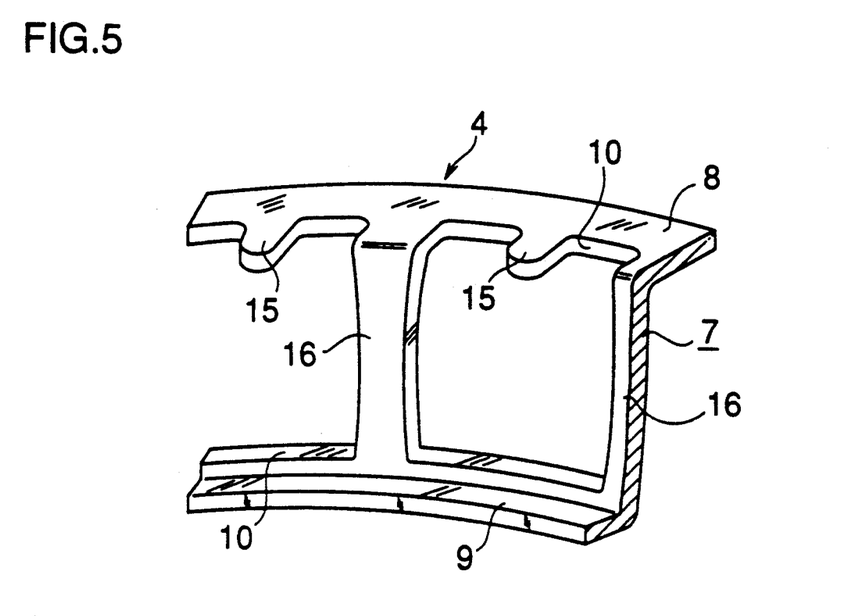
FIG. 5 is a perspective view of the retainer of FIG. 2, partially cut-away, as seen from the inside.

The retainer 4 is made, e.g. by punch-pressing and bending processes as shown in FIG. 4 and FIG. 5, and comprised of the outward flange 8, the inward flange 9 and ribs 16 for connecting the outward flange 8 and inward flange 9 to define apertures for pockets. In the embodiment of this invention the ribs 16, which separate adjacent pockets 10, have been bent outward in the radial direction in order to form the outward flange 8 in the large diameter section of the main part 7 of the retainer 4 as shown in FIGS. 4 and 5.

Figure 6:
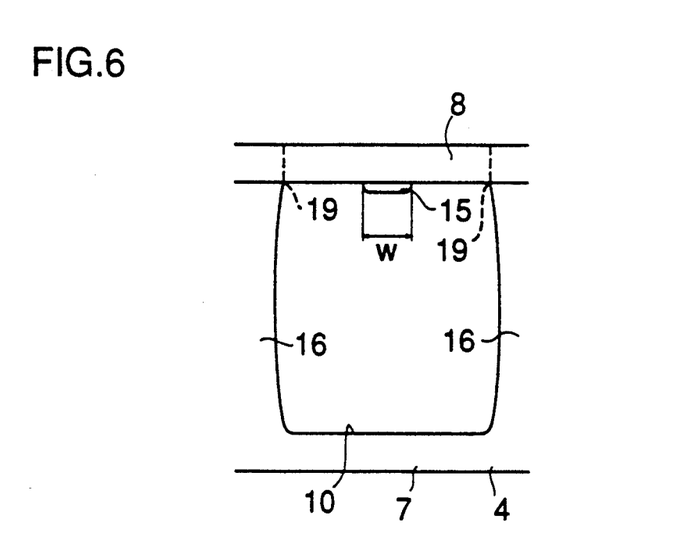
FIG. 6 is a view in the VI-direction of FIG. 4.

In operation, the self-aligning roller bearing with retainer of this invention prevents the rollers 3 held in the pockets 10 from falling out in the radial directions by the engagement between the tongue 15 and the concave section 14. The rigidity of the cantilever tongue 15 extending from the inside peripheral edge of the outward flange 8 can be freely regulated by its width "W" in the circumferential direction or its length "L" in the radial direction as shown in FIG. 4 and FIG. 6, and so installability of the rollers 3 into the pockets 10 can be maintained without having to reduce the plate thickness of the metal plate from which the retainer 4 is formed. Therefore, the strength of the retainer is sufficiently maintained.

Figure 8A:
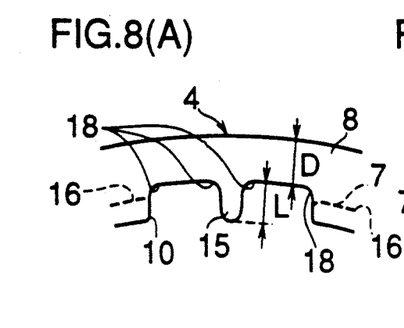
FIG. 8(a) is a side view of a retainer to show a second example of the tongues with a different length.
Figure 8B:
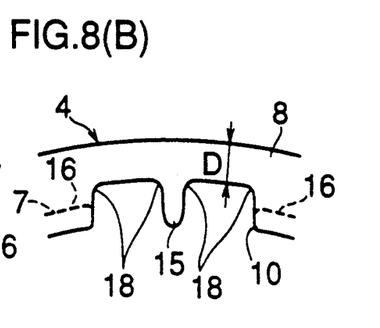
FIG. 8(b) is a side view of a retainer to show a third example of the tongues with a different length.

As shown in FIG. 8 (A) and (B), the length L of the tongues 15 can be regulated freely by changing the width D of the outward flange 8. In doing this, the position of the tip of the tongues 15 and the outer peripheral edge of the outward flange 8 do not change in position, and therefore it is not necessary to change the dimensions of the the other parts such as the rollers 3 and the guide ring 11 other than the retainer 4. Therefore, it is possible to improve the installability of the rollers 3 into the pockets 10 with the plate thickness of the metal plate, from which the retainer 4 is formed, being sufficiently thick, and thus making it possible to sufficiently maintain the strength of the retainer 4.

Also, for the embodiment of this invention as shown in the drawings, since the outward flange 8 is formed on the edge of the main part 7 of the retainer 4 in the larger diameter section by bending the ribs 16 outward in the radial direction at a point short of its end, the curvature of the corners 18 of the aperture for each pocket 10 can be made small making it possible to prevent cracks from occurring in these corners 18 and to prevent interference between the corner 18 of the aperture for each pocket 10 and the peripheral surface of the end face of the roller 3.

In contrast, the outward flange 8 of the prior art retainer, as shown in FIG. 13, is formed by bending the ribs 16 in the outward radial direction at a point of or very closer to the end of the ribs 16. Therefore, when the curvature of the corners 18 of the aperture for the pocket 10 is decreased, the corners 18 interfere with the ends of the spherical rollers 3. Therefore, in the prior art retainer, in order to prevent this interference from occurring, the curvature of the corners 18 is made large. If the curvature of the corners 18 of the aperture for the pocket 10 is made large, it is easy for stress to be concentrated in the corners 18 and thus making it easy for undesirable cracks to occur in the corners 18.

For the embodiment of this invention, as shown in the drawings, it is clearly evident from FIGS. 4 thru 6 that even if the curvature of the corners 18 of the apertures formed in the metal plate in order to make the pockets 10 is made small, the corners 18 are changed to the corners 19 by bending the ribs 16 at a portion short of its end to make the outward flange 8 upright, so that the apparent curvature of the corners 19 of the aperture for the pocket 10 is kept large (see FIG. 6). As a result, interference between the corners 19 and the outer peripheral surface at the end face of the rollers 3 is prevented, while at the same time it is possible to prevent cracks from occurring in the corners 18.

Furthermore, since the tongues 15 are relatively near the inner ring 2 and the diameter of the outer edge of the concave section 14 is large, it is easy to lubricate the inner peripheral side of the rollers 3.

Figure 14:
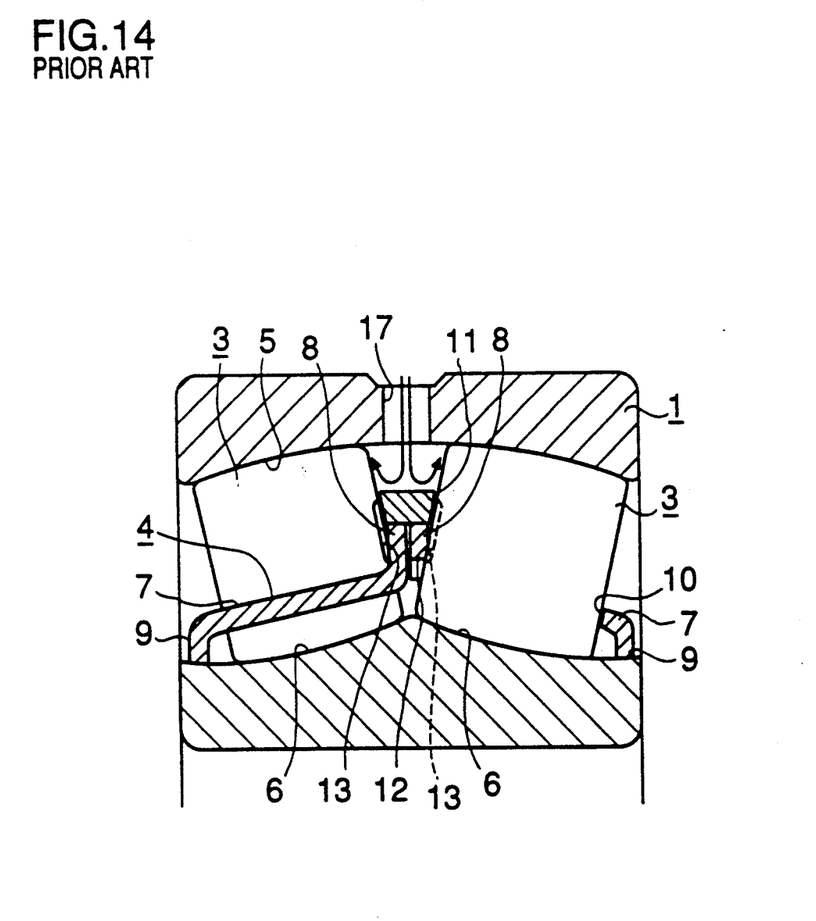
FIG. 14 is a cross-sectional view of another example of the prior art roller bearing having an oil supply hole in the outer ring for the lubricant.

For the prior art retainer, as shown in FIG. 14, even though lubricant oil is supplied to the inside of the outer ring 1 through the oil supply hole 17 formed in the axially middle portion of the outer ring 1, the lubricant oil is blocked by the guide ring 11 generally in contact with the end face of the rollers 3, making it difficult to reach the outside peripheral surface of the inner ring 2.

Figure 7:
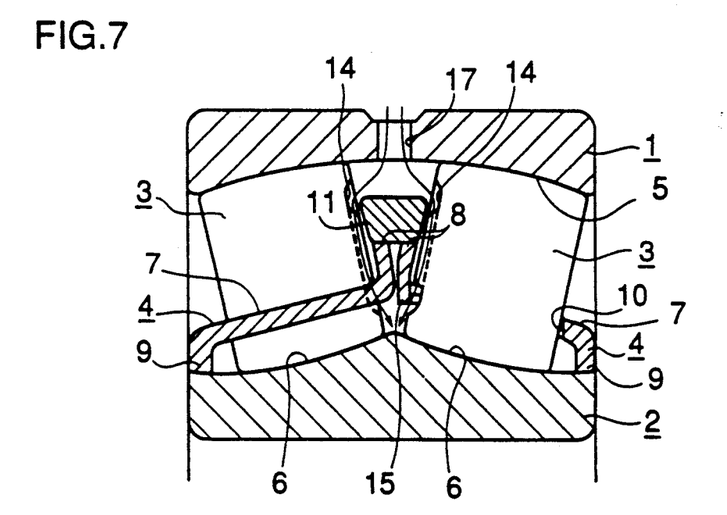
FIG. 7 is a cross-sectional view showing another embodiment of the roller bearing of the present invention having an oil supply hole in the outer ring for the lubricant.

For the embodiment of this invention, as shown in FIG. 7, the lubricant oil supplied to the inside of the outer ring 1, specifically in a space defined by the outer ring 1, the guide ring 11 and the end faces of the rollers 3 in two rows, through the oil supply hole 17 in the axially middle portion of the outer ring 1 is led into the concave section 14, and by the rotation of the concave section 14 with the rollers 3, reaches to the inside of the guide ring 11. Also, on the inside of the guide ring 11, the lubricant oil in the concave section 14 is swept by the tongues 15, and then moved onto the inside peripheral surface of the inner ring 2.

Also, in the case where the concave section 14 on the end face of the rollers 3 is formed in a ring shape and the portion of the end face of the rollers 3 inside the ring shape facing the guide ring 11 is formed in a convex spherical shape, it is possible to reduce the friction force between the end face of the rollers 3 and the guide ring 11.

Specifically, in the case where the portion of the end face of the rollers 3 which faces the guide ring 11 has a convex spherical shape, the contact area is reduced, and the end face of the rollers 3 comes in sliding contact with the side face of the guide ring 11 at a location on the inside of the ring-shaped concave section 14 very near the rotation axis of roller. Therefore, the friction force between the rollers 3 and the guide ring 11 is small and so power loss is also small.

If the end face of the rollers 3 comes in sliding contact with the side face of the guide ring 11 at a location relatively remote from the rotation axis of roller, the friction force occurring between the rollers 3 and the guide ring 11 would become large and also power loss would become large.

Certain changes may be made in the above apparatus without departing from the scope of the invention herein involved. For example, the concave section 14 on the end face of the rollers 3 in this embodiment of the invention is not limited to a ring shape, and it is also possible to make the retainer out of plastic. Therefore, it is intended that all matter contained in the above description or shown in the accompanying drawings shall be interpreted as illustrative and not in a limiting sense.

What is claimed is:

1. A self-aligning roller bearing with retainer comprising;
    an outer ring having an inside peripheral surface and a concave spherical inner race with a single center formed on the inside peripheral surface,
    an inner ring having an outside peripheral surface and a pair of inner races formed on the outside peripheral surface so as to face the outer race,
    a plurality of freely rotating rollers arranged in two rows between the outer race and the inner races and having a pitch circle,
    a pair of retainers located radially inside the pitch circle of the rollers and having a frustum-shaped main part formed with larger and smaller diameter sections, the retainer having an outward flange extending radially outward from the larger diameter section of the main part of the retainer, and an inward flange extending radially inward from the smaller diameter section of the main part of the retainer wherein a plurality of pockets are formed in the retainer for holding freely rotatably the rollers,
    a freely rotating guide ring located between the two rows of rollers and having an inside peripheral surface,
    the outward flange having an outer peripheral edge guided by the inside peripheral surface of the guide ring, and the inward flange having an inner peripheral edge guided by the outside peripheral surface of the inner ring;

the rollers having one end face formed with a concave section thereon opposed to the outward flange, and the outward flange having a plurality of tongues formed along the inner peripheral edge of the outward flange and each located in one of the pockets, respectively, and the tongues extending radially inward and facing the one end face of the rollers, wherein the engagement of the tongues with the concave sections prevents the rollers from falling out of the pockets.

2. The self-aligning roller bearing with retainer of claim 1, in which the outward flange is formed by bending radially outward the ribs separating adjacent pockets.

3. The self-aligning roller bearing with retainer of claim 1, in which an oil supply hole is formed in flow communication with a space defined by the outer ring, the guide ring and the rollers in two rows.

4. The self-aligning roller bearing with retainer of claim 1, in which the one end face of the rollers has a portion facing the guide ring and having a convex spherical shape and the concave section of the one end face of the rollers is formed in a ring shape.

* * * * *